US010004123B1

(12) United States Patent
Yang et al.

(10) Patent No.: US 10,004,123 B1
(45) Date of Patent: Jun. 19, 2018

(54) FAILURE DETECTION AND ALERTING CIRCUIT FOR A DIFFERENTIAL MODE SURGE PROTECTION DEVICE IN AN LED DRIVER

(71) Applicant: Universal Lighting Technologies, Inc., Madison, AL (US)

(72) Inventors: Haiqing Yang, Madison, AL (US); Keith Davis, Madison, AL (US)

(73) Assignee: UNIVERSAL LIGHTING TECHNOLOGIES, INC., Madison, AL (US)

(*) Notice: Subject to any disclaimer, the term of this patent is extended or adjusted under 35 U.S.C. 154(b) by 0 days. days.

(21) Appl. No.: 15/711,327

(22) Filed: Sep. 21, 2017

Related U.S. Application Data

(60) Provisional application No. 62/416,568, filed on Nov. 2, 2016.

(51) Int. Cl.
*H02H 3/20* (2006.01)
*H05B 33/08* (2006.01)
*H01C 7/12* (2006.01)
*H02H 3/04* (2006.01)

(52) U.S. Cl.
CPC ............ *H05B 33/089* (2013.01); *H01C 7/12* (2013.01); *H05B 33/0809* (2013.01); *H05B 33/0842* (2013.01); *H02H 3/04* (2013.01); *H02H 3/20* (2013.01)

(58) Field of Classification Search
CPC .................................. H02H 3/04; H02H 3/20
USPC .......... 361/91.1, 91.4; 340/638, 691.1, 691.8
See application file for complete search history.

(56) References Cited

U.S. PATENT DOCUMENTS

| | | | | |
|---|---|---|---|---|
| 5,978,198 A | * | 11/1999 | Packard | H02H 9/042 361/111 |
| 6,778,375 B1 | * | 8/2004 | Hoopes | H02H 9/042 361/120 |
| 8,467,163 B2 | * | 6/2013 | Asplund | H02H 9/042 361/111 |
| 8,762,083 B2 | * | 6/2014 | Rodseth | G01R 31/07 702/65 |

\* cited by examiner

*Primary Examiner* — Thuy Vinh Tran
(74) *Attorney, Agent, or Firm* — Patterson Intellectual Property Law, P.C.; Gary L. Montle; Jerry Turner Sewell

(57) ABSTRACT

An apparatus and a method monitor the status of a thermal protection device within a surge protection device (SPD). A monitoring circuit connected to a monitor output signal of the SPD is responsive to the presence of a time-varying voltage on the monitor output signal. The time-varying voltage is present during a selected half of each AC cycle when the thermal protection device is intact such that the SPD is no longer providing surge protection. The time-varying voltage is not present when the thermal protection device is no longer intact. When the time-varying voltage is not present for a selected duration, the monitoring circuit illuminates a light-emitting diode (LED) to indicate that the thermal protection device has failed.

7 Claims, 5 Drawing Sheets

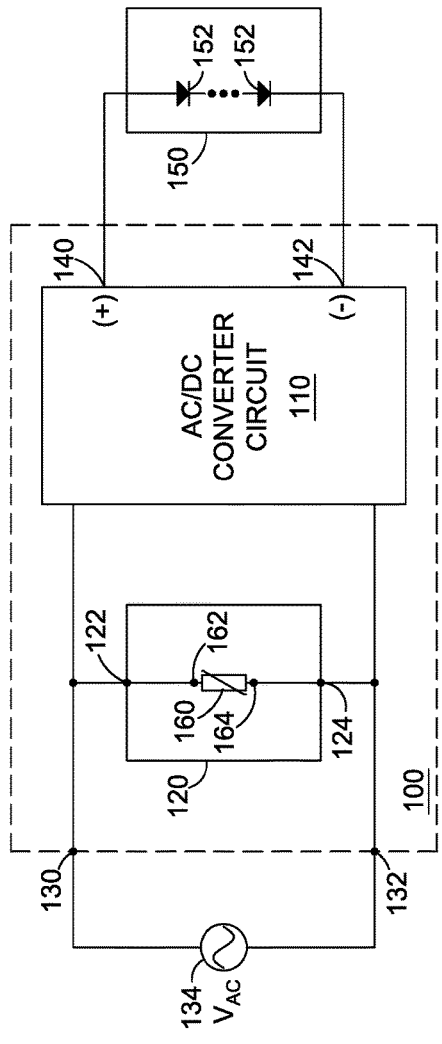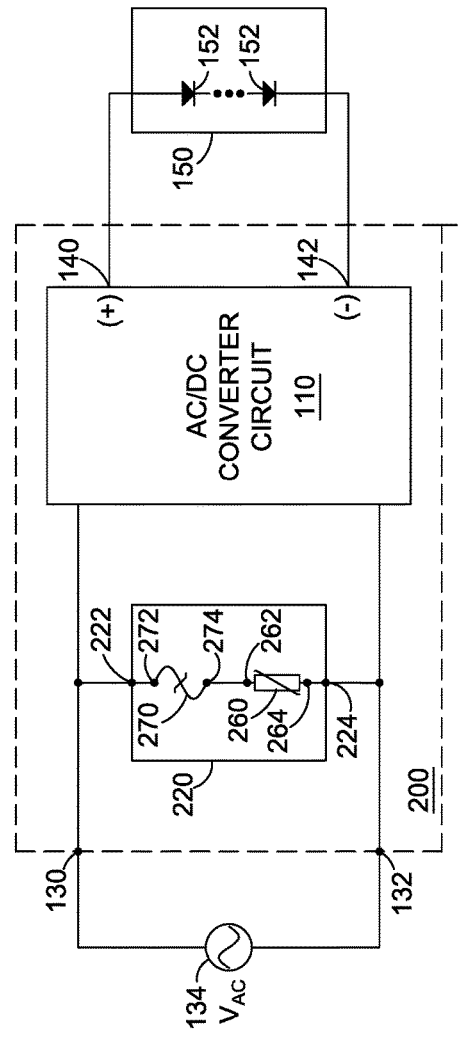
Fig. 1
Fig. 2

US 10,004,123 B1

FAILURE DETECTION AND ALERTING CIRCUIT FOR A DIFFERENTIAL MODE SURGE PROTECTION DEVICE IN AN LED DRIVER

CROSS-REFERENCE TO RELATED APPLICATION

This application claims benefit of the following patent application, which is hereby incorporated by reference: U.S. Provisional Patent Application No. 62/416,568, filed Nov. 2, 2016, entitled "Failure Detection and Alerting Circuit for a Differential Mode Surge Protection Device in an LED Driver."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The usage of light-emitting diodes (LEDs) to provide illumination is increasing rapidly as the costs of LEDs decrease and the endurances of the LEDs increase to cause the overall effective cost of operating LED lighting products to be lower than the overall effective costs of operating incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. In order to leverage the benefit of long life of LEDs, LED drivers must also be designed to be robust under lighting surge events. Surge protection devices (SPDs) are provided to absorb energy and protect the LED driver circuit. An SPD can also fail under certain conditions (e.g., a surge event with excessive voltage). One desired feature is for an LED driver to be able to provide a failure indication mechanism in case a surge protection device (SPD) fails. Such transparent communication upon SPD failure alerts customers immediately so that a failed SPD can be replaced in a timely manner. This saves time and costs for customers who would otherwise spend lengthy time troubleshooting SPD failures, which, if unresolved, could require replacement of the entire LED driver.

SUMMARY OF THE INVENTION

An aspect of the embodiments disclosed herein is an apparatus and a method to monitor the status of a thermal protection device within a surge protection device (SPD). A monitoring circuit connected to a monitor output signal of the SPD is responsive to the presence of a time-varying voltage on the monitor output signal. The time-varying voltage is present during a selected half of each AC cycle when the thermal protection device is intact. The time-varying voltage is not present when the thermal protection device is no longer intact such that the SPD is longer providing surge protection. When the time-varying voltage is not present for a selected duration, the monitoring circuit illuminates a light-emitting diode (LED) to indicate that the thermal protection device has failed.

Another aspect of the embodiments disclosed herein is a failure indication circuit for monitoring a three-terminal, internally thermally fused surge protection device (SPD), wherein the SPD includes a metal-oxide varistor (MOV) in series with a thermal fuse between a first power terminal and a second power terminal. The first power terminal and the second power terminal are connected to a first AC input terminal and a second AC input terminal, respectively, to receive an AC voltage across the first power terminal and the second power terminal. The SPD further includes a monitor output line connected to a common node between the MOV and the thermal fuse. The common node is connected to the first power terminal when the thermal fuse is intact. The common node is disconnected from the first power terminal when the thermal fuse is open. The failure indication circuit comprises a diode, a resistor and an input circuit of an optical isolator connected in series between the monitor output line of the SPD and one of the first and second power terminals of the SPD. A voltage source provides a supply voltage referenced to a DC reference voltage. A resistor and an output circuit of the optical isolator are connected in series between the voltage source and the DC reference voltage. The output circuit of the optical isolator has an output node connected to the resistor. A capacitor is connected between the output node of the optical isolator and the DC reference voltage. The capacitor charges during a first half-cycle of each cycle of the AC voltage across the first and second power terminals. The capacitor discharges during a second half-cycle of each cycle of the AC voltage only when the thermal fuse is intact. The capacitor remains charged during the second half-cycle of each cycle of the AC voltage when the thermal fuse is open. A semiconductor switch has a control input terminal, a current input terminal and a current output terminal. The control input terminal is coupled to the output node of the optical isolator. The current output terminal is connected to the reference voltage. The semiconductor switch turns on only when the capacitor remains charged during the second half-cycles of a plurality of cycles of the AC voltage. A light-emitting diode (LED) and a current limiting resistor are connected in series between the low-voltage source and the current input terminal of the semiconductor switch. The LED illuminates when current flows through the semiconductor switch when the capacitor remains charged during the second half-cycles of the plurality of cycles of the AC voltage. In certain embodiments, the semiconductor switch is a bipolar transistor, the control terminal of the semiconductor switch is the base of the bipolar transistor, the current input terminal is the collector of the bipolar transistor, and the current output terminal is the emitter of the bipolar transistor. In certain embodiments, the control terminal of the semiconductor switch is coupled to the output node of the optical isolator via a diode.

Another aspect of the embodiments disclosed herein is a surge protection circuit for a light-emitting diode (LED) driver circuit connectable to a first AC input terminal and a second AC input terminal, wherein the second AC input terminal provides a reference voltage, and the first AC input terminal provides a time-varying AC voltage with respect to the reference voltage. The surge protection circuit comprises a three-terminal, internally thermally fused surge protection device (SPD) that includes a metal-oxide varistor (MOV) electrically connected in series with a thermal protection device between the first AC input terminal and the second AC input terminal. The SPD further includes a monitor output terminal connected to a common node between the MOV and the thermal protection device. The monitor output terminal provides a time-varying output voltage corresponding to the time-varying AC voltage on the first AC input terminal when the thermal protection device is intact. The monitor output terminal provides a voltage corresponding to the reference voltage when the thermal protection device is open. The surge protection circuit further includes an SPD failure indication circuit that comprises an optical isolator circuit having an input circuit and an output circuit. The output circuit selectively conducts when a current of sufficient magnitude flows through the input circuit. The input circuit is coupled to the monitor output terminal to receive current only when the thermal protection device is intact. An indicator drive circuit is coupled to the output circuit of the optical isolator circuit. The indicator drive circuit is turned off when the output circuit is conducting. The indicator drive circuit is turned on when the output circuit does not conduct for at least a selected time duration. An LED is coupled to the indicator drive circuit. The LED illuminates when the indicator driver circuit is turned on. In certain embodiments of the surge protection circuit, the indicator drive circuit comprises a semiconductor switch having a control terminal. The control terminal is responsive to a control voltage having a threshold magnitude below which the semiconductor switch is in an off-state. A capacitor is coupled to the control terminal of the semiconductor switch. The capacitor charges during a first half-cycle of each cycle of the time-varying AC voltage to reach a voltage magnitude lower than the threshold magnitude of the control voltage of the semiconductor switch. The capacitor discharges during a second half-cycle of each cycle of the time-varying AC voltage only when the thermal protection device in the SPD is intact. Discharging of the capacitor during the second half-cycles maintains the control voltage below the threshold magnitude and thereby maintains the semiconductor switch in the off-state. The charge on the capacitor accumulates on subsequent first half-cycles of the time-varying AC voltage when the thermal protection device is open to allow the control voltage to increase to at least the threshold magnitude to change the state of the semiconductor switch to an on-state corresponding to the indicator drive circuit being turned on. In certain embodiments, the selected time duration is determined by the time required for the voltage on the capacitor to increase to the threshold magnitude after the thermal protection device opens.

Another aspect of the embodiments disclosed herein is a method for indicating a failure of a thermal protection device in a three-terminal surge protection device, wherein the three-terminal surge protection device has a metal-oxide varistor connected in series with the thermal protection device between an AC reference terminal and an AC voltage terminal. The three-terminal surge protection device also has a monitor output terminal that provides a monitor output voltage. The monitor output terminal is electrically connected to the AC voltage terminal when the thermal protection device is intact. The monitor output terminal is disconnected from the AC voltage terminal when the thermal protection device is open. The method comprises applying the monitor output voltage to an input circuit of an optical isolator. The optical isolator has an output circuit responsive to a current flowing through the input circuit to electrically connect a first output terminal to a second output terminal when the current flowing through the input circuit has a sufficient magnitude. The method further comprises coupling the first output terminal of the output circuit of the optical isolator to a control terminal of semiconductor switch and to a capacitor. The semiconductor switch is turned on when a control voltage on the control terminal reaches a threshold voltage. While the thermal protection device is intact, the method comprises discharging the capacitor during a first half-cycle of each AC cycle and charging the capacitor during a second half-cycle of each AC cycle. The charging rate of the capacitor is selected to maintain the voltage on the control terminal of the semiconductor switch below the threshold voltage during each second half-cycle. When the thermal protection device opens, the method comprises discontinuing the discharge of the capacitor during the first half-cycles of the AC cycles to allow the control voltage on the control terminal of the semiconductor switch to increase to at least the threshold voltage to turn on the semiconductor switch. When the semiconductor switch turns on, the method comprises conducting current through the semiconductor switch and an indicator light-emitting diode (LED) to cause the LED to illuminate to indicate that the thermal protection device is open.

BRIEF DESCRIPTION OF THE SEVERAL VIEWS OF THE DRAWINGS

FIG. 1 illustrates a circuit diagram of a conventional light-emitting diode (LED) driver circuit that includes a converter circuit protected by a conventional surge protection device (SPD) connected between a line input terminal and a neutral input terminal of an alternating-current (AC) mains.

FIG. 2 illustrates a circuit diagram of an LED driver circuit that includes a thermally protected SPD connected between a line input terminal and a neutral input terminal of an AC mains.

DETAILED DESCRIPTION OF THE INVENTION

Figure 3:
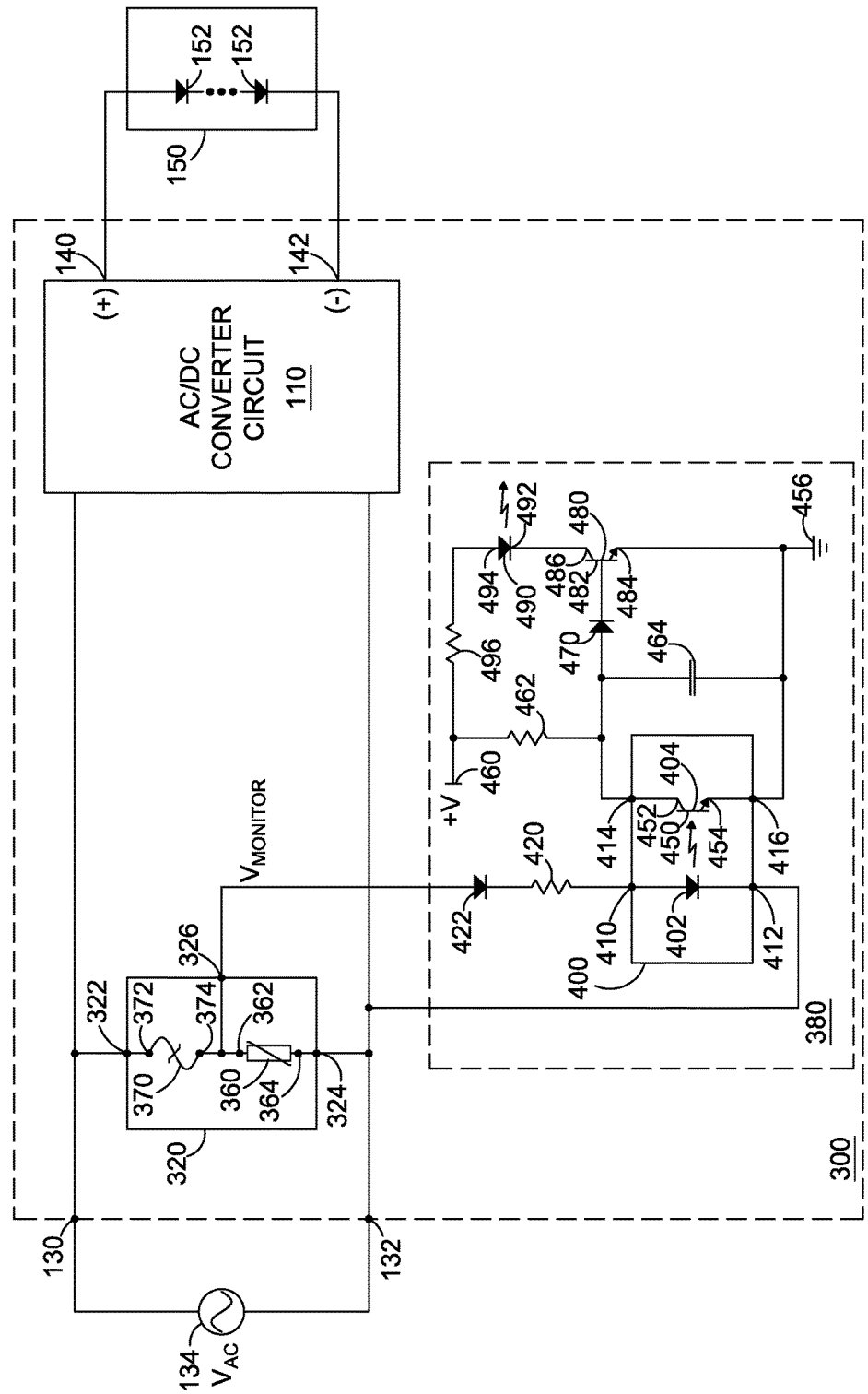
FIG. 3 illustrates a circuit diagram of an LED driver circuit that includes a three terminal thermally protected SPD (TTSPD) having first power terminal connected to a line input terminal of an AC mains, having a second power terminal connected to a neutral input terminal of the AC mains, and having monitor output terminal connected to a failure indication circuit, the failure indication circuit including a visual indicator that illuminates when a thermal protection device within the TTSPD fails.

FIG. 1 illustrates a circuit diagram of a conventional light-emitting diode (LED) driver circuit 100 that includes an AC/DC converter circuit 110. The converter circuit is protected by a conventional differential mode surge protection device (SPD) 120 having a first power terminal 122 and a second power terminal 124. The first power terminal of the SPD is connected to a first AC input terminal 130. The second power terminal of the SPD is connected to a second AC input terminal 132. The first and second AC input terminals are connectable to a conventional alternating-current (AC) mains 134. As discussed below, the SPD is responsive to a difference between the voltage on the first power terminal and the voltage on the second power terminal to selectively clamp the voltage difference to a safe operating value for the circuitry protected by the SPD.

The converter circuit 110 operates in a conventional manner to convert the AC input voltage from the AC mains 134 to a DC voltage between a first (+) DC output terminal 140 and a second (−) DC output terminal 142. The first and second DC output terminals are connectable to a DC load 150, such as, for example, an LED load comprising a plurality of LEDs 152. In the illustrated embodiment, the LED load may comprise at least two LEDs connected in series. In other embodiments, the LED load may comprise five or more LEDs connected in series or connected in a series-parallel combination.

The illustrated driver circuit 100 may receive an AC input voltage of approximately 120 volts, in which case the first AC input terminal 130 may be connected to the hot (line) wire and the second AC input terminal 132 may be connected to the neutral wire of the AC mains 134. In many residences and offices, the neutral wire is connected to earth ground at a service entrance panel (not shown). Thus, the voltage on the line wire is positive with respect to the neutral wire during a first half-cycle of each AC cycle and is negative with respect to the neutral wire during a second half-cycle of each AC cycle. For the purpose of the following discussion, the voltage on the second AC input terminal is referred to as the input reference voltage. In other embodiments, the driver circuit may receive an AC input voltage of 240 volts or 277 volts, in which case both the first AC input terminal and the second AC input terminal are connected to respective hot (line) wires. Although the second AC input terminal is not grounded in a 240-volt or 277-volt configuration, the first AC input terminal can still be considered to be varying positively and negatively with respect to the second AC input terminal. Thus, the voltage on the second AC input terminal in the 240-volt or 277-volt configuration can still be considered to be the reference voltage.

The illustrated driver circuit 100 provides a selected output voltage between the first DC output terminal 140 and the second DC output terminal 142. The output voltage has a magnitude sufficient to drive the DC load 150. For example, when the DC load comprises two LEDs 152 connected in series, a nominal output voltage may be approximately 5.6 volts, which represents the total forward voltage drop across two LEDs. As another example, when the DC load comprises five LEDs connected in series, the nominal output voltage may be approximately 14 volts, which represents the total forward voltage drop across five LEDs. It should be appreciated that a conventional LED driver circuit controls the current through the series-connected LEDs to maintain the current at or near a selected magnitude. For example, the current may be controlled to approximately 180 milliamps for certain commercially available LEDs. Other LEDs may require currents having greater magnitudes or currents having lesser magnitudes. The converter circuit monitors the current flowing through the LEDs and selectively varies the output voltage across the series-connected LEDs to maintain the current at or near the selected magnitude.

Although the AC input voltage from the mains 134 should remain substantially constant, the actual voltage may vary in accordance with conditions in the generation and distribution system providing the AC input voltage to a residence or a commercial building. The driver circuit 100 should be designed to accommodate reasonable variations in the magnitude of the AC input voltage; however, voltage surges may occur that exceed such reasonable variations. For example, a lightning strike at or near the residence or commercial building may increase the AC input voltage by a substantial amount in excess of the design limits of the driver circuit. The excess voltage may damage or even destroy one or more components within the converter circuit 110 such that the LED driver circuit is no longer operational.

The SPD 120 is included in the circuit 100 to protect the converter circuit 110 from damage caused by voltage surges. In the embodiment of FIG. 1, the SPD comprises a metal-oxide varistor (MOV) 160. The MOV has a first power terminal 162 corresponding to the first terminal 122 of the SPD. The first power terminal of the MOV is electrically connected to the first AC input terminal 130. The MOV has a second power terminal 164 corresponding to the second terminal 124 of the SPD. The second power terminal of the MOV is electrically connected to the second AC input terminal 132.

The MOV 160 in the SPD 120 absorbs the energy from the excess voltage caused by a voltage surge. The MOV clamps the voltage across the two power input terminals 162, 164 to a maximum voltage that is selected to be within the design limits of the driver circuit. For example, for a driver circuit designed for connection to a conventional 120-volt AC mains 134, the MOV may be selected to clamp the voltage between the first and second AC input terminals 130, 132 whenever the RMS AC input voltage exceeds approximately 320 volts. When clamping occurs, the MOV operates as a low-resistance resistor to route current directly from the first AC input terminal to the second AC input terminal, thus bypassing the converter circuit.

The conventional MOV 160 illustrated in FIG. 1 is commercially available from many manufacturers (e.g., Littelfuse, Inc.; Thinking Electronic Industrial Company, Ltd.; Semiconductor Components Industries, LLC; and the like). Within the normal operational AC input voltage range (e.g., voltages below the clamping voltage), the MOV has a very high resistance between the first power terminal 162 and the second power terminal 164. Thus, when the input voltage from the AC mains 134 is within acceptable limits, the MOV has little, if any, effect on the operation of the driver circuit 100. The resistance of the MOV is voltage dependent. When the voltage across the power terminals 162, 164 of the MOV is greater than the clamping voltage (threshold voltage), the resistance of the MOV decreases rapidly and approaches zero ohms. The low resistance of the clamped MOV effectively causes current caused by the excess voltage to bypass the converter circuit 110. The excess voltage is clamped to a selected magnitude, which is sufficiently low to protect the converter circuit from damage.

Although the MOV 160 of FIG. 1 is effective to protect the converter circuit 110 from voltage surges up to a maximum voltage (e.g., approximately 500 volts in one example), some voltage surges may exceed the maximum voltage. When the maximum voltage is exceeded, the MOV may be damaged by excess energy passing through the MOV, which may render the MOV inoperative as a protective device. Furthermore, if the voltage surge is sufficiently great (e.g., as a result of nearby lightning strike), the MOV may fail catastrophically because the energy absorbed by the MOV may be many orders of magnitude greater than the MOV can safely handle. In some circumstances, the catastrophic failure may be violent such that the MOV is melted or burned. In addition to damaging the MOV, adjacent components in the driver circuit 100 may be damaged by material ejected from the MOV, which may require repairs to the driver circuit in addition to the replacement of the MOV.

FIG. 2 illustrates a circuit diagram of an LED driver circuit 200 that includes an initial solution to the problems caused by damage to the MOV 160 of FIG. 1. The driver circuit of FIG. 2 is similar to the driver circuit of FIG. 1 except that the SPD 120 of FIG. 1 is replaced with a thermally protected ("thermally fused") SPD (TPSPD) 220. The TPSPD of FIG. 2 is also a two-terminal surge protection device. The TPSPD has a first power terminal 222 connected to the first AC input terminal 130 and has a second power terminal 224 connected to the second AC input terminal 132.

The TPSPD 220 of FIG. 2 includes an MOV 260. The MOV has a first power terminal 262 and a second power terminal 264. The TPSPD also includes a thermal protection device 270. The thermal protection device has a first power terminal 272 and a second power terminal 274. In the illustrated embodiment, the thermal protection device is a fuse that opens when the temperature caused by excess current exceeds a predetermined magnitude.

The second power terminal 264 of the MOV 260 within the TPSPD 220 corresponds to the second power terminal 224 of the TPSPD. The first power terminal 262 of the MOV is connected to the second terminal 274 of the thermal protection device 270. The first terminal 272 of the thermal protection device is connected to the first power terminal 222 of the TPSPD. Thus, the thermal protection device and the MOV are connected in series between the first power terminal and the second power terminal of the TPSPD.

The MOV 260 in the TPSPD 220 operates in a similar manner to the operation of the MOV 160 of FIG. 1. In contrast to the previously described MOV, the MOV in FIG. 2 is protected from high currents by the thermal protection device 270. In particular, when the current through the thermal protection device exceeds a rated current, the thermal protection device opens and remains open to block further current through the MOV. The rated current is selected to open the thermal protection device before the heat generated by the current is sufficient to cause catastrophic failure of the MOV that could damage other components in the driver circuit 100.

Although the TPSPD 220 of FIG. 2 prevents the catastrophic failure of the MOV 260 within the TPSPD, the opening of the thermal protection device 270 effectively removes the MOV from the driver circuit 110. Thus, the converter circuit 120 and other components of the driver circuit are no longer protected by the voltage clamping function of the MOV. A subsequent voltage surge may damage the converter circuit and other components unless the failed TPSPD is replaced promptly after the failure occurs. Since the driver circuit continues to operate after the failure of the TPSPD, no indication is provided that the failure has occurred to prompt the replacement of the TPSPD.

FIG. 3 illustrates a circuit diagram of a driver circuit 300 that solves the foregoing problem. In particular, the driver circuit of FIG. 3 generates a failure indication to prompt the replacement of a thermally protected ("thermally fused") SPD that has failed. The driver circuit of FIG. 3 is similar to the driver circuit 200 of FIG. 2; however, the two-terminal TPSPD 220 of FIG. 2 is replaced with a three-terminal thermally protected SPD (TTSPD) 320. The TTSPD has a first power terminal 322 and a second power terminal 324. The TTSPD of FIG. 3 further includes a third terminal 326. As described below, the third terminal of the TTSPD is a monitor terminal. One example of the TTSPD suitable for protecting the driver circuit operating with a 120-volt RMS input from the AC mains is a Part No. TMOV20RP320M thermally protected varistor, which is commercially available from Littelfuse, Inc.

The first power terminal 322 of the TTSPD 320 is connected to the first AC input terminal 130. The second power terminal 324 of the TTSPD is connected to the second AC input terminal 132. The TTSPD includes an MOV 360, which has a first power terminal 362 and having a second power terminal 364. The TTSPD further includes a thermal protection device (e.g., fuse) 370, which has a first terminal 372 and a second terminal 374.

The second power terminal 364 of the MOV 360 within the TTSPD 320 corresponds to the second power terminal 324 of the TTSPD. The first power terminal 362 of the MOV is connected to the second terminal 374 of the thermal protection device 370. The second power terminal of the MOV and the first terminal of the thermal protection device are also connected to the third (monitor) terminal 326 of the TTSPD. The first terminal 372 of the thermal protection device is connected to the first power terminal 322 of the TTSPD. Thus, the thermal protection device and the MOV are connected in series between the first power terminal and the second power terminal of the TTSPD.

The driver circuit 300 of FIG. 3 further includes a monitoring and indication circuit (failure indication circuit) 380, which is connected to the third (monitor) terminal 326 of the TTSPD 320. The monitoring terminal of the TTSPD provides a status voltage ($V_{MONITOR}$) that is responsive to the voltage at the common connection of the first power terminal 362 of the MOV 360 and the second terminal 374 of the thermal protection device 370. During normal operation when the thermal protection device is intact (e.g., the thermal fuse is not open), the thermal protection device provides a low-resistance electrical path from the first power terminal 322 of the TTSPD to the monitoring terminal. The monitoring terminal is connected to the second power terminal 324 of the TTSPD via the MOV. The MOV has a very high impedance during normal (non-surge) operations such that little, if any, current flows through the MOV. Thus, the voltage on the monitoring terminal tracks the voltage on the first power terminal during normal operations.

When the thermal protection device 370 of the TTSPD 320 opens in response to an excessive overvoltage/overcurrent condition, the monitoring terminal 326 of the TTSPD is no longer electrically connected to the first power terminal 322 of the TTSPD. The monitoring terminal is only connected to the second power terminal 324 of the TTSPD via the MOV 360. Since no current can flow through the MOV from the first power terminal of the TTSPD, the voltage at the monitoring terminal is the same as, or is substantially the same as, the voltage at the second power terminal of the TTSPD. Thus, the voltage at the monitoring terminal is the same as, or substantially the same as, the voltage on the second AC input terminal 132, which, as discussed above, is the input reference voltage.

The monitoring and indication circuit 380 monitors the voltage on the monitoring terminal 326 of the TTSPD 320 and provides a perceptible indication that the TTSPD has failed (e.g., that the thermal protection device 370 within the TTSPD has opened such that the TTSPD is no longer providing surge protection). In the illustrated embodiment, the perceptible indication provided by the monitoring and indication circuit is a visual failure indication, which is described below.

The monitoring and indication circuit 380 includes a conventional optical isolator 400 that includes an input (light source) circuit 402 (e.g., an LED) and an output (light sensor) circuit 404 (e.g., a phototransistor). The light source circuit and the light sensor circuit are separated within the optical isolator by a galvanic barrier (not shown) such that no voltage or current within the light source circuit is transferred to the light sensor circuit. The optical isolator operates in a conventional manner such that current flowing through the LED in the light source circuit from a first input terminal 410 to a second input terminal 412 generates light that is communicated to the phototransistor in the light sensor circuit to cause the phototransistor to conduct current from a first output terminal 414 to a second output terminal 416.

The first input terminal (e.g., the anode) 410 of the light source circuit 402 is connected via a current-limiting resistor 420 and a rectifier diode 422 to the monitoring terminal 326 of the TTSPD 320. The second input terminal (e.g., the cathode) 412 of the light source circuit is connected to the second power terminal 324 of the TTSPD and to the second AC input terminal 132.

In the illustrated embodiment, the rectifier diode 422 has an anode connected to the monitoring terminal 326 and has a cathode connected to the current-limiting resistor 420. Current flows through the series connection of rectifier diode, the current-limiting resistor and the light source circuit 402 during a portion of the first half-cycle of the AC input voltage when the first AC input terminal 130 has a more positive voltage with respect to the second AC input terminal 132. No current flows during a second half-cycle of the AC input voltage when the polarity is reversed such that the second AC input terminal is more positive with respect to the first AC input terminal. The orientations of the anode and cathode of the rectifier diode and the orientation of the anode and the cathode of the light source circuit can both be reversed from the illustrated orientation such that current only flows when the second AC input terminal is more positive than the first AC input terminal. The relative positions of the rectifier diode, the current-limiting resistor and the light source circuit in the series connection can also be varied from the illustrated positions.

In the illustrated embodiment, the light sensor circuit 404 (e.g., phototransistor) comprises a photosensitive base 450, a collector terminal 452 and an emitter terminal 454. The emitter terminal is connected to a secondary ground reference 456, which is galvanically isolated from the input reference voltage. The collector terminal is connected to a secondary voltage source (+V) 460 via pull-up resistor 462. In the illustrated embodiment, the secondary voltage source provides a secondary supply voltage of +5 volts referenced to the secondary ground reference. In certain embodiments, the secondary supply voltage is generated within the converter circuit 110 as shown.

The collector terminal 452 of the phototransistor 404 is also connected to the secondary ground reference 456 via a filter capacitor 464. The collector terminal is also connected to an anode of a base circuit diode 470. A cathode of the base circuit diode is connected to the base terminal 482 of a power transistor 480. In the illustrated embodiment, the power transistor is a NPN bipolar transistor. The power transistor has an emitter terminal 484 connected to the secondary ground reference. The power transistor has a collector terminal 486, which is connected to a cathode 492 of an indicator LED 490. An anode 494 of the indicator LED is connected to the secondary voltage source via a current-limiting resistor 496. The illustrated circuit can be reconfigured to use a PNP bipolar transistor or to use a MOSFET as the power transistor.

Figure 4:
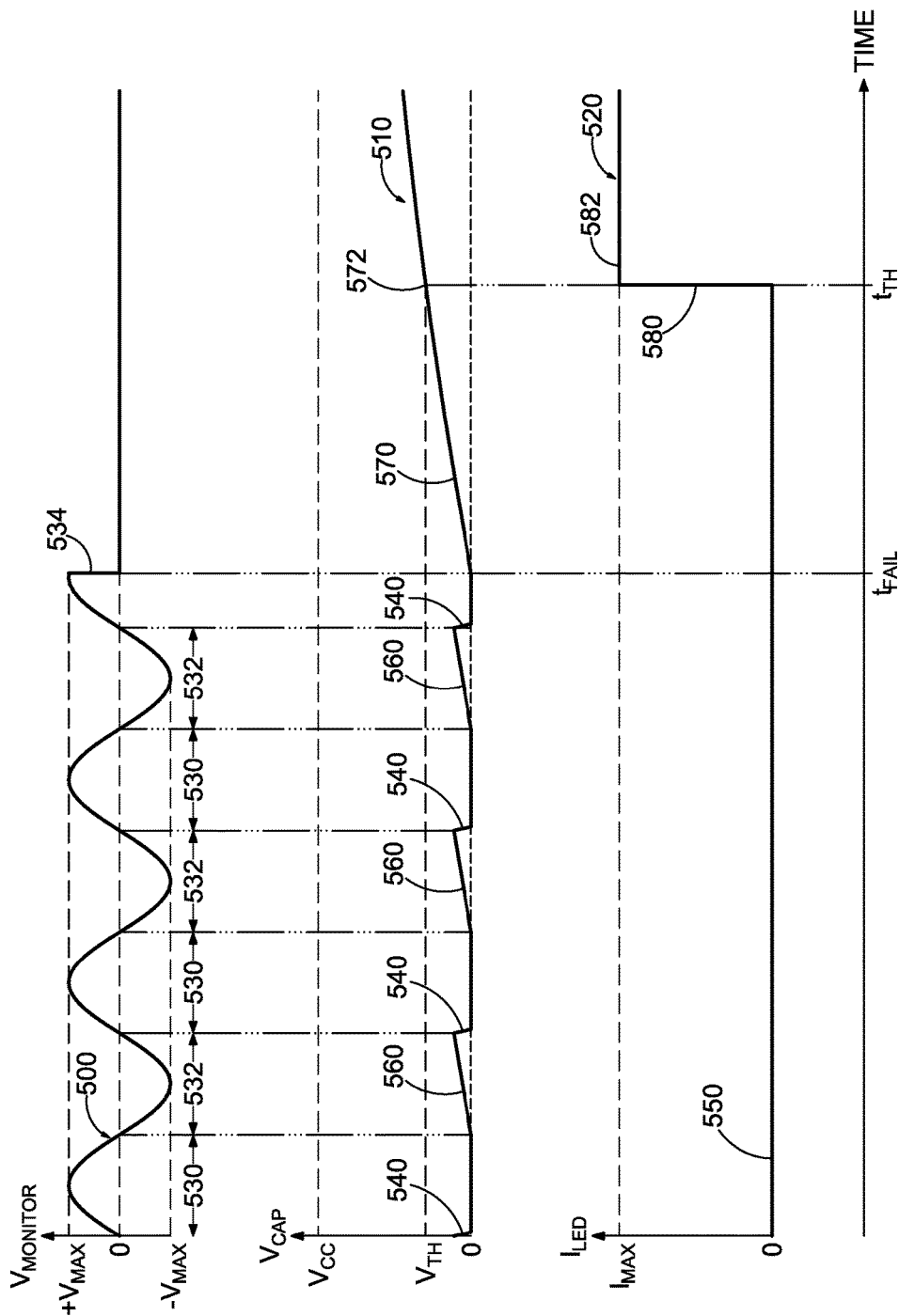
FIG. 4 illustrates waveforms of the voltage of the monitor output terminal (upper waveform), the voltage of the filter capacitor (middle waveform) and the current through the indicator LED (lower waveform) of the driver circuit of FIG. 3, wherein the waveforms illustrated the response to the failure of the thermal protection device of FIG. 3.

The operation of the monitoring and indication circuit 380 is illustrated by three waveforms in FIG. 4. A first waveform 500 represents the status voltage $V_{MONITOR}$ on the monitor output terminal 326 of the TTSPD 320. A second waveform 510 represents a voltage $V_{CAP}$ on the filter capacitor 464. A third waveform 520 represents a current $I_{LED}$ through the indicator LED 490.

When the TTSPD 320 in FIG. 3 is fully operational to provide surge protection as described above, the voltage on the monitoring terminal 320 follows the voltage on the first power input terminal 322 and thus follows the line voltage on the first AC input terminal 130. The voltage on the monitoring terminal is a time-varying voltage, which is positive relative to the input reference voltage on the second power input terminal 324 during a first half-cycle 530 in each AC cycle and is negative relative to the input reference voltage during a second half-cycle 532 in each AC cycle. The alternating half-cycles of positive and negative magnitudes on the status voltage continue until a failure of the thermal protection device occurs at a time $t_{FAIL}$, at which time the status voltage abruptly transitions to a zero voltage with respect to the AC reference voltage as represented by a transition 534 of the status voltage ($V_{MONITOR}$) waveform. In the illustrated example, the thermal protection device fails near the middle of one of the positive half-cycles of the input voltage. The thermal protection device may also fail at other times during either half-cycle in accordance with the timing of the occurrence of a lightning strike or other cause of an excessive voltage surge.

During portions of the first (positive) half-cycle 530 of each cycle of the monitor voltage $V_{MONITOR}$, the rectifier diode 422 is forward biased to enable current to pass from the monitoring terminal 326 through the current limiting resistor 420 to the first input terminal 410 of the light source circuit 402 of the optical isolator 400. The current passes through the light source circuit to the second input terminal 412, and returns to the second power input terminal 322 of the TTSPD 320. The current thus returns to the second AC input terminal 132. The current flow causes the light source circuit to generate light when the voltage on the monitoring terminal is sufficiently high to exceed a threshold voltage ($V_{TH}$) corresponding to the total of the forward bias voltage of the rectifier diode and the forward bias voltage of the LED within the light source circuit. During the second half-cycle 532 of each AC cycle, the rectifier diode and the LED within the light source circuit are reverse-biased to block current flow in the opposite direction.

When current flows through the light source circuit 402 of the optical isolator 400, the light incident on the photosensitive base 450 of the phototransistor (light sensor circuit) 404 causes the phototransistor to conduct, which effectively couples the collector terminal 452 of the phototransistor to the secondary ground reference 456 via the emitter terminal 454 of the phototransistor. Thus, the filter capacitor 464—which is connected from the collector terminal to the secondary ground reference—is rapidly discharged to zero volts as represented by transitions 540 in the capacitor voltage ($V_{CAP}$) waveform 510. With zero volts on the collector terminal of the phototransistor, no base current flows through the base circuit diode 470 to the base terminal 482 of the power transistor 480. The power transistor is off and does not conductor any current from the collector terminal 486 to the emitter terminal 484. Thus, no current flows through the indicator LED 490, as represented by a zero-current portion 550 of the current waveform ($I_{LED}$) 520 in FIG. 4. With no current flowing, the indicator LED 490 does not illuminate.

During each negative half-cycle 532 of the monitor voltage $V_{MONITOR}$, no current flows through the rectifier diode 422 and the light source circuit 402. Thus, the light source circuit does not generate any light to transmit to the photosensitive base 450 of the phototransistor (light sensor circuit) 404. The phototransistor does not conduct during the second half-cycle of the AC input voltage, which allows the filter capacitor 464 to charge via the pull-up resistor 462 as represented by an increasing voltage waveform 560 of the capacitor voltage waveform ($V_{CAP}$) 520 in FIG. 4. The capacitance of the filter capacitor and the resistance of the pull-up resistor are selected such that the RC time-constant of the series connected resistor and capacitor is sufficiently large to prevent the filter capacitor from charging to the threshold voltage ($V_{TH}$) to forward bias the base circuit diode 470 and the base-emitter junction of the power transistor 472. Thus, the power transistor also remains off during each second half-cycle of the AC voltage, and no current is provided to cause the indicator LED 490 to illuminate.

In the illustrated embodiment, the filter capacitor 464 has a capacitance of approximately 2.2 microfarads, and the pull-up resistor 462 has a resistance of approximately 50,000 ohms to provide a time constant of approximately 110 milliseconds such that the filter capacitor charges to no more than about 0.1 volt during the first half-cycle of the AC input voltage. Each half-cycle has a duration of approximately 8.33 milliseconds in a 60 Hz AC system and has a duration of approximately 10 milliseconds in a 50-Hz AC system.

When the thermal protection device 370 in the TTSPD 360 opens at the time $t_{FAIL}$, as described above, the voltage on the anode of the rectifier diode 422 remains at or near zero volts throughout both of the first and second half-cycles of the AC input voltage. Thus, no current flows through the light source circuit 402 during either half-cycle after the TTSPD fails. The absence of current flowing through the light source circuit causes the phototransistor (light sensor circuit) 404 to remain off, which allows the filter capacitor 464 to continue to charge via the pull-up resistor 462 without being periodically discharged as represented by an increasing waveform 570 of the $V_{CAP}$ voltage 510 in FIG. 4. In the illustrated example, the thermal protection device fails during a positive half-cycle 530, and the filter capacitor begins charging as soon as the failure occurs. If the thermal protection device fails during a negative half-cycle 532 of monitor voltage $V_{MONITOR}$, the capacitor will have already begun to charge and will continue to charge to the end of the negative half-cycle and into the subsequent positive and negative half-cycles.

When the voltage $V_{CAP}$ on the filter capacitor 464 increases to the threshold voltage ($V_{TH}$) as shown at a value 572 of the capacitor voltage waveform 510, the voltage is sufficient to exceed the total forward bias voltages of the base circuit diode 470 and the base-emitter junction of the power transistor 480. The power transistor conducts to provide current through the indicator LED 490 and the current-limiting resistor 496 as represented by a transition 580 to a magnitude 582 of the LED current waveform ($I_{LED}$) 520 in FIG. 4. The indicator LED illuminates to provide a perceptible (e.g., visual) indication that the TTSPD 320 has failed and is no longer protecting the power converter 110 and the other components of the driver circuit 300. The LED remains illuminated thereafter as long as the secondary supply voltage is present.

The time constant of the filter capacitor 464 and the pull-up resistor 462 may be selected to allow the filter capacitor to charge to the threshold voltage $V_{TH}$ in a few AC cycles (e.g., a few tens of milliseconds) or over a few seconds. Once the thermal protection device 370 has opened, the filter capacitor will not discharge again and the indicator LED 490 will remain illuminated. Thus, the duration of the time before the voltage on the filter capacitor reaches a sufficient charge is not critical. A slow charge time is acceptable, and the RC time constant of the pull-up resistor 462 and the filter capacitor 464 can be large to reduce the power consumed during the periodic charging and discharging that occurs when the thermal protection device is intact.

When the failed TTSPD 320 is replaced with a TTSPD with an intact thermal protection device 370, the voltage on the monitoring terminal 326 is again present during the first half-cycle of each cycle of the AC input voltage. Thus, the filter capacitor 464 no longer charges to a sufficient voltage ($V_{TH}$) to cause the power transistor 480 to conduct and enable current to illuminate the indicator LED 490.

The foregoing circuit provides a simple and economical way to provide an unambiguous indication that the TTSPD 320 has failed and should be replaced. When the TTSPD fails, the indicator LED 490 illuminates and remains illuminated until the failed TTSPD is replaced with a fully-functional TTSPD having an intact thermal protection device 370.

The indicator LED 490 may be located directly on a circuit board that implements the driver circuit 300 when the driver circuit is visible in certain configurations. Since no current flows through the indicator LED until the TTSPD 320 fails, no power is consumed by the indicator LED during normal operation. Furthermore, by configuring the indicator LED to illuminate only when a failure of the TTSPD has occurred, a service person monitoring the status of a number of driver circuits 300 only has to react when an indicator LED is illuminated. Such monitoring is much easier and less prone to error than a system in which an indicator is active during normal operation and becomes inactive when an error occurs.

Figure 5:
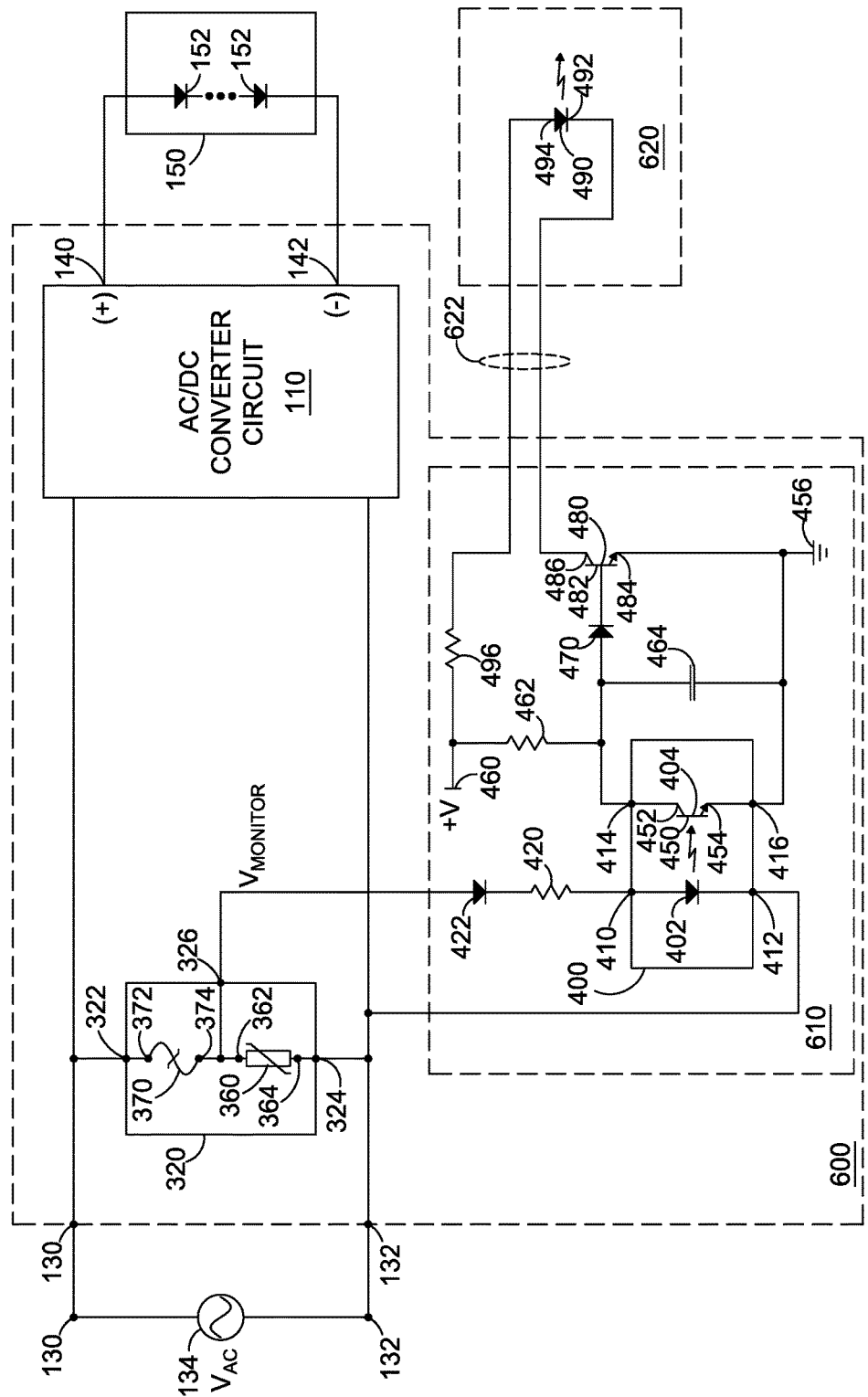
FIG. 5 illustrates a circuit diagram of an LED driver circuit similar to the driver circuit of FIG. 3 wherein the failure indication circuit is modified to move the visual indicator to a remote monitoring station.

In an alternative embodiment illustrated in FIG. 5, a driver circuit 500 includes a modified monitoring and indication circuit 610. The modified monitoring and indication circuit of FIG. 5 is similar to the monitoring and indication circuit 380 of FIG. 3; however, the modified monitoring and indication circuit of FIG. 5 does not include the indicator LED 490 with the other circuitry. Instead, the indicator LED is located remotely, such as, for example, at a monitoring station 620. The indicator LED is electrically connected to the modified monitoring and indication circuit via a cable 622. In the embodiment, of FIG. 5, the indicator LED may be easily monitored at the monitoring station even when the driver circuit is located above a ceiling or in another hidden location. The indicator LED may be included with the indicator LEDs from a number of other similar driver circuits (not shown).

Figure 6:
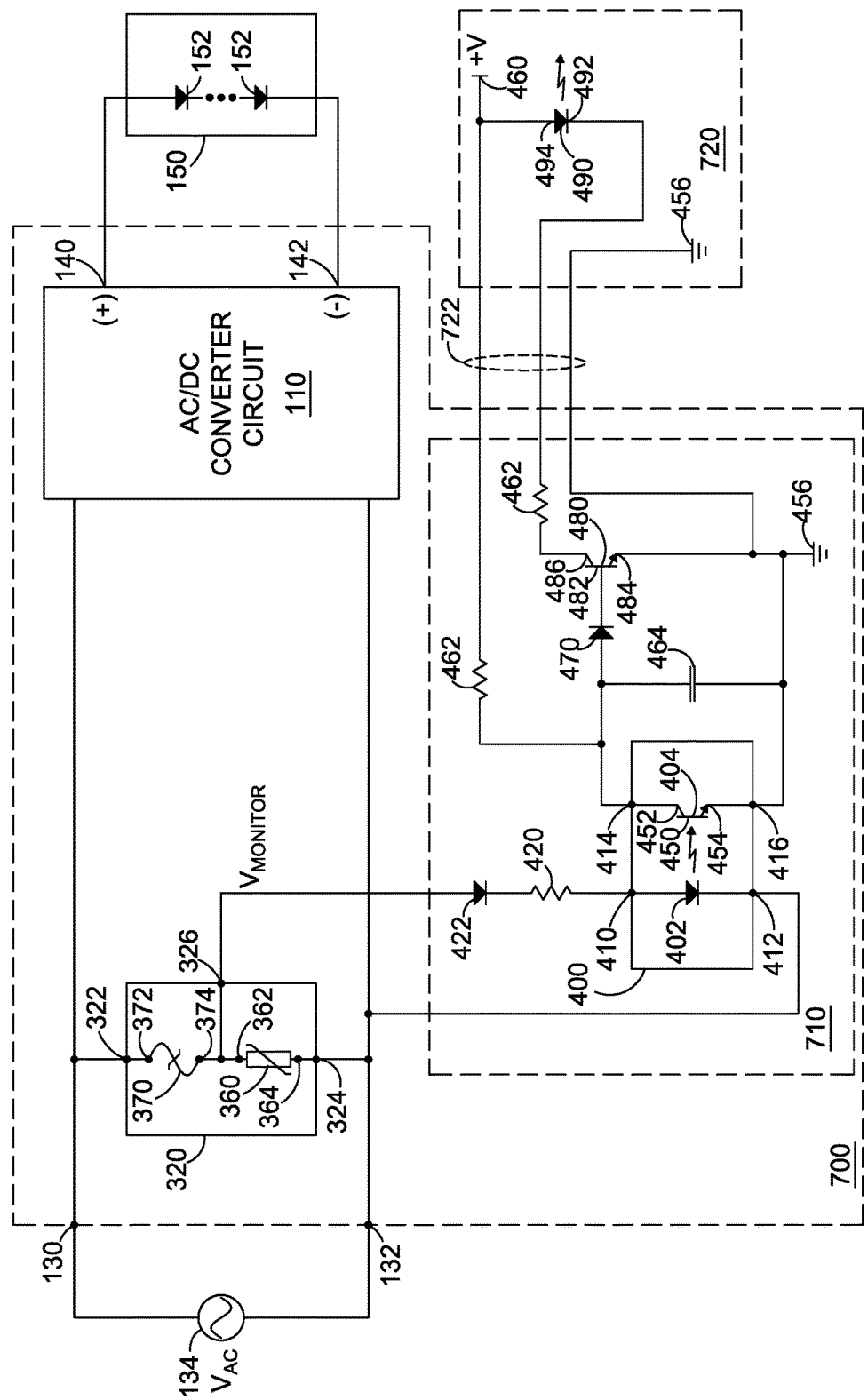
FIG. 6 illustrates a circuit diagram of an LED driver circuit similar to the driver circuit of FIG. 5 wherein the failure indication circuit is further modified to move the power source to a remote monitoring station along with the visual indicator.

In a further alternative embodiment illustrated in FIG. 6, a driver circuit 700 includes a further modified monitoring and indication circuit 710. The further modified monitoring and indication circuit of FIG. 6 is similar to the modified monitoring and indication circuit 610 of FIG. 5; however, the further modified monitoring and indication circuit of FIG. 6 does not include the secondary supply voltage source 460. Instead, the voltage source is positioned at a monitoring station 720 that may also house the indicator LED 490. The secondary supply voltage is produced with reference to the secondary ground reference 456, which is also included at the monitoring station. The secondary supply voltage and the ground reference are provided to the further modified monitoring and indication circuit via a cable 722 that also includes the signal line from the power transistor 480 to the indicator LED. In the illustrated embodiment, the pull-up resistor 462 and the current-limiting resistor 496 are located in the further modified monitoring and indication circuit. In a still further embodiment (not shown), one or both of the pull-up resistor and the current-limiting resistor may be positioned at the monitoring station with the indicator LED.

The previous detailed description has been provided for the purposes of illustration and description. Thus, although there have been described particular embodiments of the present invention of a new and useful "Failure Detection and Alerting Circuit for a Differential Mode Surge Protection Device in an LED Driver," it is not intended that such references be construed as limitations upon the scope of this invention except as set forth in the following claims.

What is claimed is:

1. A failure indication circuit for monitoring a three-terminal, internally thermally fused surge protection device (SPD), the SPD including a metal-oxide varistor (MOV) in series with a thermal fuse between a first power terminal and a second power terminal, the first power terminal and the second power terminal connected to a first AC input terminal and a second AC input terminal, respectively, to receive an AC voltage across the first power terminal and the second power terminal, the SPD further including a monitor output line connected to a common node between the MOV and the thermal fuse, the common node connected to the first power terminal when the thermal fuse is intact, the common node disconnected from the first power terminal when the thermal fuse is open, the failure indication circuit comprising:
   a diode, a resistor and an input circuit of an optical isolator connected in series between the monitor output line of the SPD and one of the first and second power terminals of the SPD;
   a voltage source that provides a supply voltage referenced to a DC reference voltage;
   a resistor and an output circuit of the optical isolator connected in series between the voltage source and the DC reference voltage, the output circuit of the optical isolator having an output node connected to the resistor;
   a capacitor connected between the output node of the optical isolator and the DC reference voltage, the capacitor charging during a first half-cycle of each cycle of the AC voltage across the first and second power terminals, the capacitor discharging during a second half-cycle of each cycle of the AC voltage only when the thermal fuse is intact, the capacitor remaining charged during the second half-cycle of each cycle of the AC voltage when the thermal fuse is open;
   a semiconductor switch having a control input terminal, a current input terminal and a current output terminal, the control input terminal coupled to the output node of the optical isolator, the current output terminal connected to the reference voltage, the semiconductor switch turning on only when the capacitor remains charged during the second half-cycles of a plurality of cycles of the AC voltage; and
   a light-emitting diode (LED) and a current limiting resistor connected in series between the low-voltage source and the current input terminal of the semiconductor switch, the LED illuminating when current flows through the semiconductor switch when the capacitor remains charged during the second half-cycles of the plurality of cycles of the AC voltage.

2. The failure indication circuit as defined in claim 1, wherein the semiconductor switch is a bipolar transistor, the control terminal of the semiconductor switch is the base of the bipolar transistor, the current input terminal is the collector of the bipolar transistor, and the current output terminal is the emitter of the bipolar transistor.

3. The failure indication circuit as defined in claim 1, wherein the control terminal of the semiconductor switch is coupled to the output node of the optical isolator via a diode.

4. A surge protection circuit for a light-emitting diode (LED) driver circuit connectable to a first AC input terminal and a second AC input terminal, the second AC input terminal providing a reference voltage, the first AC input terminal providing a time-varying AC voltage with respect to the reference voltage, the surge protection circuit comprising:
   a three-terminal, internally thermally fused surge protection device (SPD) that includes a metal-oxide varistor (MOV) electrically connected in series with a thermal protection device between the first AC input terminal and the second AC input terminal, the SPD further including a monitor output terminal connected to a common node between the MOV and the thermal protection device, the monitor output terminal providing a time-varying output voltage corresponding to the time-varying AC voltage on the first AC input terminal when the thermal protection device is intact, the monitor output terminal providing a voltage corresponding to the reference voltage when the thermal protection device is open;
   an SPD failure indication circuit comprising:
       an optical isolator circuit having an input circuit and an output circuit, the output circuit selectively conducting when a current of sufficient magnitude flows through the input circuit, the input circuit coupled to the monitor output terminal to receive current only when the thermal protection device is intact;
       an indicator drive circuit coupled to the output circuit of the optical isolator circuit, the indicator drive circuit turned off when the output circuit is conducting, the indicator drive circuit turned on when the output circuit does not conduct for at least a selected time duration; and
       an LED coupled to the indicator drive circuit, the LED illuminating when the indicator driver circuit is turned on.

5. The surge protection circuit as defined in claim 4, wherein:
   the indicator drive circuit comprises:
       a semiconductor switch having a control terminal, the control terminal responsive to a control voltage having a threshold magnitude below which the semiconductor switch is in an off-state; and
       a capacitor coupled to the control terminal of the semiconductor switch, the capacitor charging during a first half-cycle of each cycle of the time-varying AC voltage to reach a voltage magnitude lower than the threshold magnitude of the control voltage of the semiconductor switch, the capacitor discharging during a second half-cycle of each cycle of the time-varying AC voltage only when the thermal protection device in the SPD is intact to maintain the control voltage below the threshold magnitude and to thereby maintain the semiconductor switch in the off-state, the charge on the capacitor accumulating on subsequent first half-cycles of the time-varying AC voltage when the thermal protection device is open to increase the control voltage to at least the threshold magnitude to change the state of the semiconductor switch to an on-state corresponding to the indicator drive circuit being turned on.

6. The surge protection circuit as defined in claim 5, wherein the selected time duration is determined by the time required for the voltage on the capacitor to increase to the threshold magnitude after the thermal protection device opens.

7. A method for indicating a failure of a thermal protection device in a three-terminal surge protection device, the three-terminal surge protection device having a metal-oxide varistor connected in series with the thermal protection device between an AC reference terminal and an AC voltage terminal, the three-terminal surge protection device further having a monitor output terminal that provides a monitor output voltage, the monitor output terminal electrically connected to the AC voltage terminal when the thermal protection device is intact, the monitor output terminal disconnected from the AC voltage terminal when the thermal protection device is open, the method comprising:

applying the monitor output voltage to an input circuit of an optical isolator, the optical isolator having an output circuit responsive to a current flowing through the input circuit to electrically connect a first output terminal to a second output terminal when the current flowing through the input circuit has a sufficient magnitude;

coupling the first output terminal of the output circuit of the optical isolator to a control terminal of semiconductor switch and to a capacitor, the semiconductor switch turning on when a control voltage on the control terminal reaches a threshold voltage;

while the thermal protection device is intact, discharging the capacitor during a first half-cycle of each AC cycle and charging the capacitor during a second half-cycle of each AC cycle, the charging rate of the capacitor selected to maintain the voltage on the control terminal of the semiconductor switch below the threshold voltage during each second half-cycle;

when the thermal protection device opens, discontinuing the discharge of the capacitor during the first half-cycles of the AC cycles to allow the control voltage on the control terminal of the semiconductor switch to increase to at least the threshold voltage to turn on the semiconductor switch; and when the semiconductor switch turns on, conducting current through the semiconductor switch and an indicator light-emitting diode (LED) to cause the LED to illuminate to indicate that the thermal protection device is open.

\* \* \* \* \*